(No Model.)
K. TORNBERG.
VELOCIMETER.
No. 587,498. Patented Aug. 3, 1897.
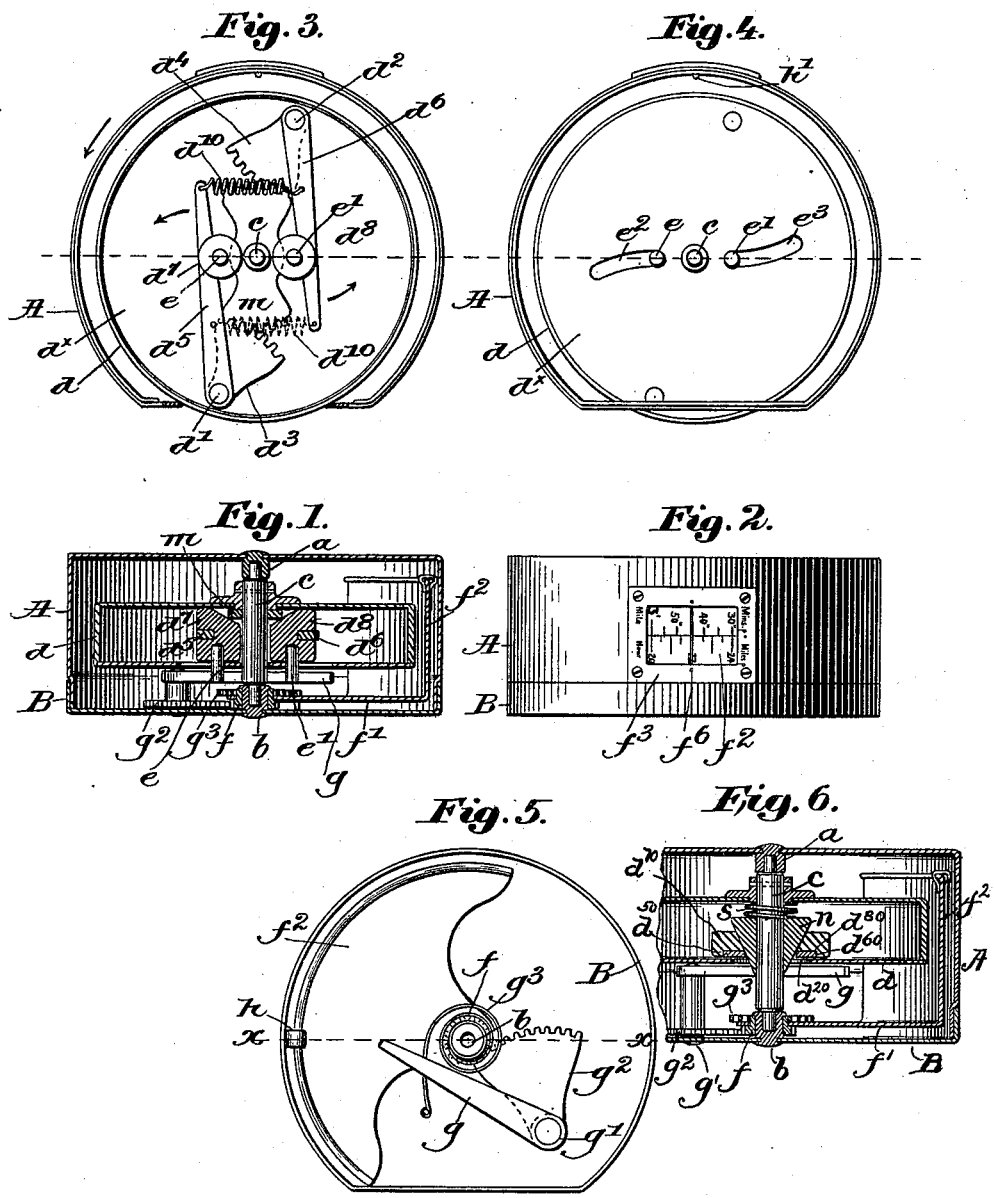
Witnesses:
Walter E. Lombard.
Thomas J. Drummond.
Inventor:
Knut Tornberg,
by Crosby Gregory.
Attys.

UNITED STATES PATENT OFFICE.

KNUT TORNBERG, OF STOCKHOLM, SWEDEN.

VELOCIMETER.

SPECIFICATION forming part of Letters Patent No. 587,498, dated August 3, 1897.

Application filed November 18, 1896. Serial No. 612,575. (No model.)

*To all whom it may concern:*

Be it known that I, KNUT TORNBERG, a subject of the King of Sweden and Norway, residing at Stockholm, Sweden, have invented an Improvement in Velocimeters, of which the following description, in connection with the accompanying drawings, is a specification, like letters on the drawings representing like parts.

This invention has for its object the production of a novel velocimeter or device for measuring speed of moving objects.

In my invention I employ a case in which is pivoted a rotatable member containing a governor, the position of which governor is varied according to changes in speed of the said rotatable member, the governor in its movements operating a scale which exhibits figures or characters indicative of certain speeds.

The velocimeter may be used to measure the speed of bicycles, carriages, street or steam cars, &c., and for measuring the linear speed of driving-belts or the surface speed of a piece of work in a lathe or other machine-tool.

Figure 1, in cross-section, shows a velocimeter containing my invention, the section being in the line $x$, Fig. 5; Fig. 2, an outside view of the same. Fig. 3 shows my velocimeter with that side of its case carrying the pinion, scale, and lever for moving it removed, together with one side of the rotatable member, to disclose the governor mechanism therein. Fig. 4 shows the side of the wheel in place. Fig. 5 shows the inner face of the parts removed from Fig. 3; and Fig. 6, in partial diametral section, represents a modified form of my invention.

The outer case A, preferably of metal and of suitable shape to contain the working parts, has a detachable cover B. (Shown in place in Fig. 1, and in Fig. 5 as removed from Fig. 3.) The case has at its inner side a bearing $a$, while the cover has a bearing $b$. These bearings receive the ends of the shaft $c$, supporting the hollow rotatable member or wheel $d$, having a removable cover $d^\times$. The back of this wheel $d$ receives two pins $d'$ $d^2$, on which are mounted loosely two like toothed segments $d^3$ $d^4$, having attached to them, respectively, arms $d^5$ $d^6$, provided each with a suitable weight $d^7$ or $d^8$, said arms being normally drawn toward the center of the wheel by a suitable spring or springs, as $d^{10}$. These weights $d^7$ $d^8$ normally stand substantially as shown in Fig. 3, and as the wheel is rotated by contact of its periphery, extended through the case, as shown in Figs. 3 and 4, with the object the surface velocity of which is to be measured these weighted levers, due to the action of centrifugal force, separate, and in doing so the pins or projections $e$ $e'$ extended therefrom through the slots $e^2$ $e^3$ move outwardly in said slots, the extent of their movement in said slots depending on the speed of rotation of the wheel. These weighted levers and their pins $e$ $e'$ act as a governor.

The bearing $b$ receives on it the hub $f$ of an arm $f'$, carrying a scale or graduation $f^2$, said scale or graduation presenting suitable figures, numbers, or scale-marks, which are exposed through a sight-opening $f^3$, fixed at the periphery of the case, as shown in Fig. 2, the frame bordering said opening having suitable registering-marks $f^6$ to coöperate with the marks carried by the scale to designate by the position of the scale the surface velocity of the moving object against which the wheel $d$ rests. As these pins are moved outwardly in the slots $e^2 e^3$, as the speed of the wheel increases, they strike rapidly a lever $g$, mounted on a stud $g'$ of the cover B, said lever having a connected toothed segment $g^2$, which engages teeth formed in or connected with the hub of the arm $f'$, the segment in its movement moving said arm and scale. The greater the speed of rotation of the wheel $d$ the farther the throw of the pins $e$ and $e'$, and consequently the farther the movement of the segment $g^2$ and the scale. A suitable spring $g^3$ returns the scale into its normal position, Fig. 5.

The scale may be provided with a loose sliding point $h$, which as the scale is moved from its position Fig. 5 to the right may meet a suitable stop $h'$, and by this means the point $h$ may be slid on the scale, the position of the said point showing the highest speed attained between starting and stopping the wheel.

The position of the point on the scale may be ascertained by removing the cover B from the case.

To insure uniform equal movement of said levers $d^5$ $d^6$ I have interposed between the segments $d^3$ and $d^4$ a double segment $m$, it being mounted loosely on said shaft $c$.

In Fig. 6 I have shown a modified construction of the governor, the case A, cover B, the bearings $a$ and $b$ for the shaft $c$, the rotatable member or wheel $d$, the hub $f$ of the arm $f'$, carrying the scale or graduation $f^2$, and the lever $g$, mounted on the stud $g'$ of the cover, and the connected tooth-segment $g^2$ in mesh with teeth on the hub of arm $f'$ are substantially the same as hereinbefore described. Instead, however, of providing pins $e$ and $e'$ to act upon and move the lever $g$ I have shown a cone $n$ mounted to slide longitudinally on the shaft $c$, and acted upon by a spring $s$ to normally move it toward and out of an opening $d^{20}$ in the side of the movable member or wheel $d$ and against the scale-controlling lever $g$.

The levers $d^{50}$ and $d^{60}$, which correspond to the levers $d^5$ and $d^6$ described and which are weighted, as at $d^{70}$ $d^{80}$, extend over the opening $d^{20}$ to more or less close it and thereby control the extent to which the cone may protrude.

Of course the greater the speed of rotation of the member or wheel $d$ the greater will be the separation of the levers $d^{50}$ and $d^{60}$ and the greater the movement of the cone and lever $g$, such construction obviating the rattling which might take place when measuring rather small velocities with the slot-and-pin construction heretofore described.

Having described my invention, what I claim, and desire to secure by Letters Patent, is—

1. A velocimeter consisting of a stationary case or holder having an opening, a rotatable member mounted therein and extended out through said opening to contact directly with the body whose speed is to be indicated, said member containing a governor mechanism, a scale, and means between said governor mechanism and said scale to move the scale for a greater or less distance according to the extent of movement of the said governing mechanism due to the speed of rotation of said rotatable member, substantially as described.

2. A velocimeter comprising a case having a sight-opening, a rotatable member in said case and having a portion of its periphery exposed, a governor mechanism carried by said member and comprising separable levers, a scale adapted to be exposed at the sight-opening, a controlling-lever for and to move the scale, and a device intermediate said separable levers and the controlling-lever, to regulate the throw of the latter, substantially as described.

3. The case or holder provided with a sight-opening, a rotatable member located in said case or holder, a governor mechanism carried by said member and presenting levers provided with pins, a scale adapted to be exposed at said sight-opening, a lever adapted to be acted upon by the pins of said governor, and a segment, and teeth between said lever and said scale to move the same, substantially as described.

4. The case or holder provided with a sight-opening, a rotatable wheel located in said case or holder, a governor mechanism carried by said wheel and presenting levers provided with pins, a scale adapted to be exposed at said sight-opening, a lever adapted to be acted upon by the pins of said governor, a segment, teeth between said lever and said scale to move the same, a sliding point carried by said scale, and a stop against which the said point may strike, substantially as described.

5. The case or holder provided with a sight-opening, a rotatable wheel located in said case or holder, a governor mechanism carried by said wheel and presenting levers provided with pins, segments connected to said levers, a double segment connecting said segments, a scale adapted to be exposed at said sight-opening, a lever adapted to be acted upon by the pins of said governor, and a segment, and teeth between said lever and said scale to move the same, substantially as described.

In testimony whereof I have signed my name to this specification in the presence of two subscribing witnesses.

KNUT TORNBERG.

Witnesses:
CARL P. GERELL,
TOM O'NEIL, Jr.